(No Model.)
M. J. ANDERSON & B. J. SMITH.
SAW MILL DOG.
No. 384,228. Patented June 12, 1888.
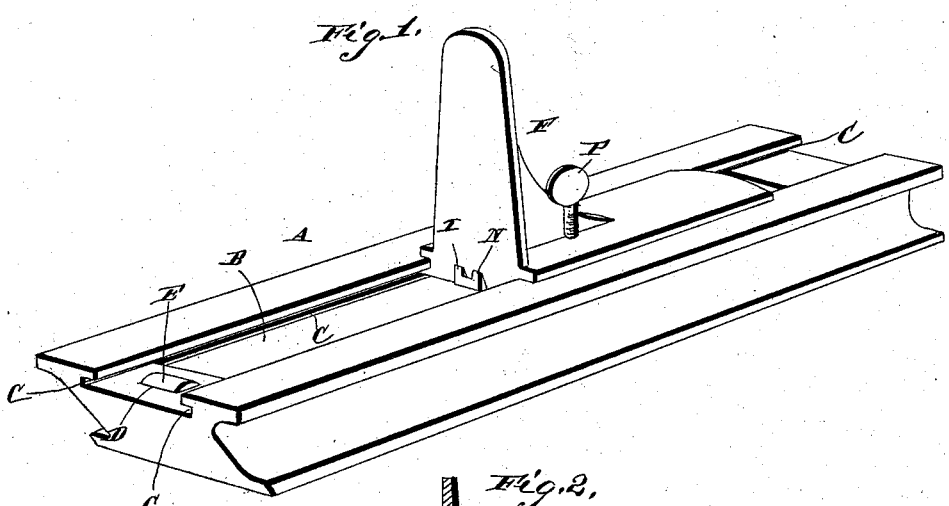
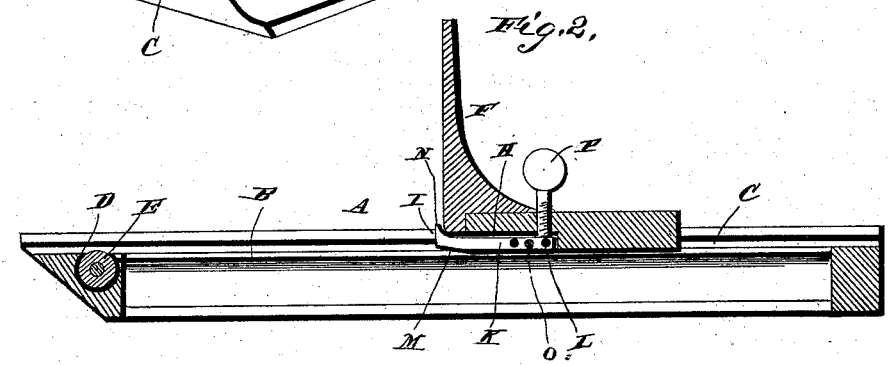
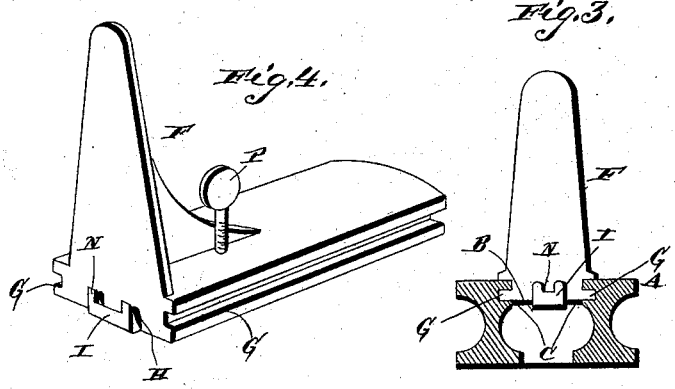
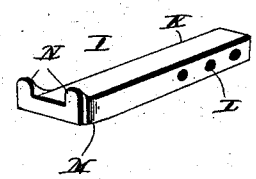
Witnesses.
Inventors.
M. J. Anderson.
B. J. Smith.
by C. A. Snow & Co.
Attorneys.

UNITED STATES PATENT OFFICE.

MILTON JOSEPH ANDERSON AND BENJAMIN JOSEPH SMITH, OF WAPINITIA, OREGON.

SAW-MILL DOG.

SPECIFICATION forming part of Letters Patent No. 384,228, dated June 12, 1888.

Application filed September 13, 1887. Serial No. 249,574. (No model.)

*To all whom it may concern:*

Be it known that we, MILTON JOSEPH ANDERSON and BENJAMIN JOSEPH SMITH, citizens of the United States, residing at Wapinitia, in the county of Wasco and State of Oregon, have invented a new and useful Improvement in Saw-Mill Dogs, of which the following is a specification.

Our invention relates to an improvement in saw-mill dogs; and it consists in the peculiar construction and combination of devices, that will be more fully set forth hereinafter, and particularly pointed out in the claims.

In the drawings, Figure 1 is a perspective view of the head-block and knee of a saw-mill carriage. Fig. 2 is a vertical longitudinal sectional view of the same. Fig. 3 is a vertical transverse sectional view. Fig. 4 is a detached perspective view of the knee. Fig. 5 is a similar view of the dog.

A represents the head-block of a saw-mill carriage, which is provided with a vertical longitudinal opening, B, and has longitudinal grooves C formed in opposing sides of the said opening, near the upper side thereof. In the outer end of the head-block is a transverse recess, D, in which is journaled a transverse anti-friction roller, E.

F represents the knee, which is adapted to slide back and forth on the head-block, being provided on opposite sides with tongues G, which enter the grooves C and bear upon the upper sides of the flanges which form the upper sides of the said grooves. In the outer end of the knee is made an open vertical longitudinal slot, H.

I represents a dog, which is made of iron and is provided with a rearward-extending shank, K, having a longitudinal series of transverse openings, L. The under side of the dog is beveled upward at a slight angle to form an incline, M, and the extreme front end of the dog is upturned and sharpened to form wedge-shaped engaging-points N. The shank of the dog fits in the slot H, made in the front side of the knee, and is secured therein by a pivotal bolt, O, which extends transversely through aligned openings in the knee and through one of the openings L, thereby enabling the dog to be adjusted longitudinally in the said slot, so that the engaging-points of the dog may be projected any desired distance beyond the front side of the knee.

P represents a regulating-screw, which works in a threaded opening in the upper side of the base of the knee and bears upon the shank of the dog at a slight distance in rear of the pivotal bolt O.

The operation of my invention is as follows: The adjusting-screw is turned so as to raise the front end of the dog a sufficient height to cause the inclined lower side, M, thereof to strike against the upper side of the roller as the dog moves forward in the head-block with the knee when feeding a log to the saw. As the knee gradually moves forward, the inclined side M causes the points N to be forced upward into the lower side of the log, and thereby hold the same firmly against the knee while being sawed. When the knee is drawn rearward in the head-block, the dog is caused to repass over the roller, and as its inclined side M runs downward over the roller the outer end of the dog is caused by its own gravity to lower, and its teeth become disengaged from the log. By adjusting the dog forward or back on its pivotal bolt not only is the distance from the front side of the knee to the engaging-points N regulated, but the depth which the said engaging-points enter the log is also controlled.

When the log is of sufficient size to make its weight render the use of the dog unnecessary, the dog is dropped downward out of the way, and not in engagement with the log. As the knee moves forward, however, and the weight of the log and the size thereof become lessened as the boards are sawed from the outer sides of the log, the dog is caused by the roller and the inclined side M to engage the log, and the dog serves to hold the log in position against the knee until the very last board is cut from the log.

Having thus described our invention, we claim—

1. The combination, in a saw-mill carriage, of the head-block having the bearing-roller on its front end, the longitudinally-movable knee, and the pivoted dog secured to the knee and depending therefrom, said dog being adapted to be raised by the roller, for the purpose set forth, substantially as described.

2. The combination, in a saw-carriage, of the head-block having the bearing-roller, the longitudinally-movable knee arranged on the head-block, and the dog pivoted to the said knee and having the forward-projecting upturned engaging-point, and provided on its under side with the inclined side M, for the purpose set forth, substantially as described.

3. The combination of the head-block having the bearing-roller with the longitudinally-movable knee, the dog pivoted thereto and adapted to be raised by the roller, and the device to adjust the dog, substantially as described.

4. The combination of the head-block, the bearing-roller journaled at one end thereof, the knee movable longitudinally on the head-block, the dog pivoted under the knee, having the points N at its front end adapted to engage a log, and the screw P, bearing on the dog to adjust the latter, so as to cause its front end to ride over the roller, and thereby hold its points in engagement with the log, substantially as described.

In testimony that we claim the foregoing as our own we have hereto affixed our signatures in presence of two witnesses.

MILTON JOSEPH ANDERSON.
BENJAMIN JOSEPH SMITH.

Witnesses:
E. F. TRUAX,
B. H. SWIFT.